Nov. 5, 1957  J. ZOLLER  2,812,087
CAR TOP BOAT CARRIER AND LOADING APPARATUS
Filed Nov. 18, 1955  2 Sheets-Sheet 2
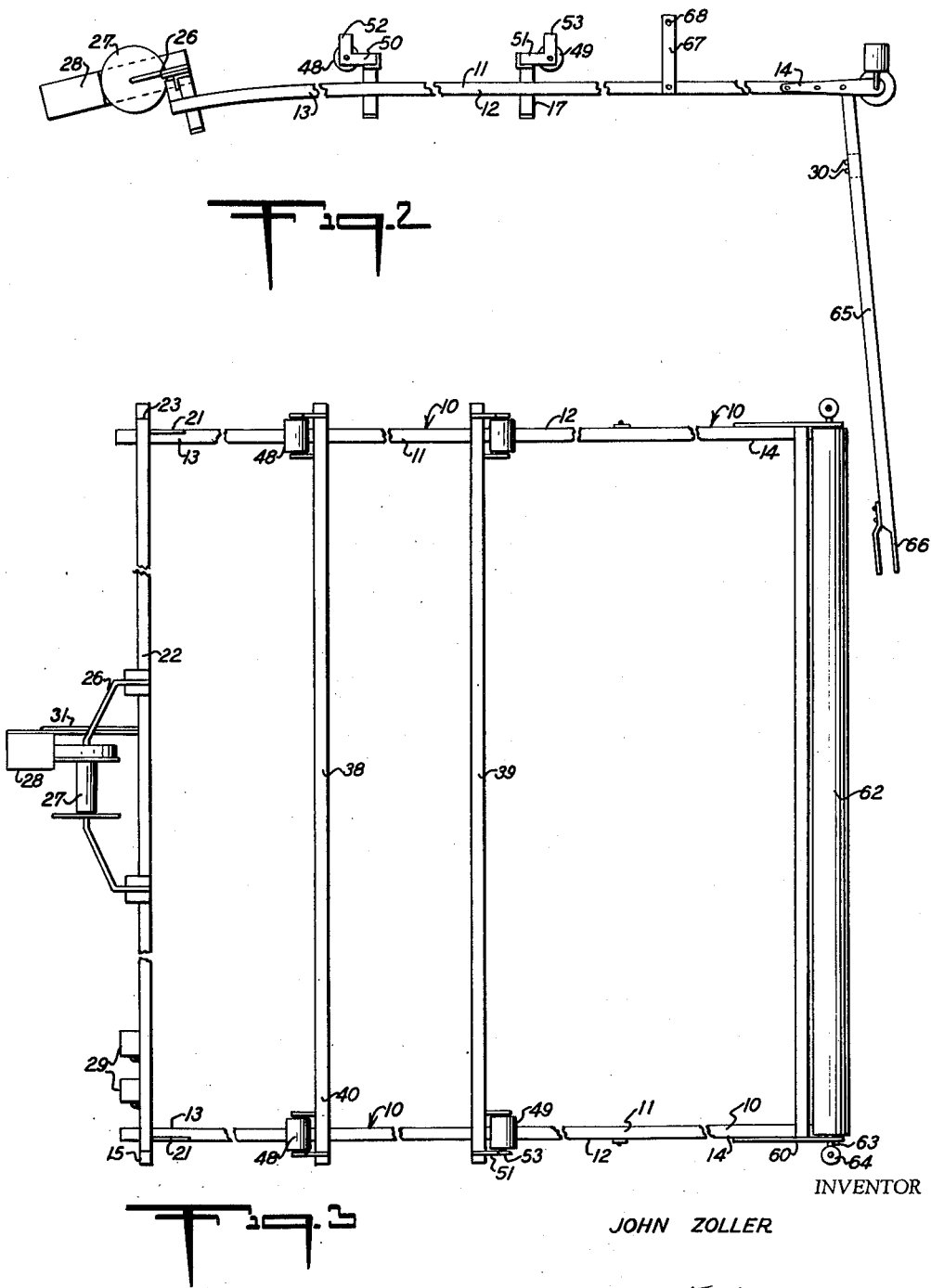
INVENTOR
JOHN ZOLLER
BY Herbert J. Jacobi
ATTORNEY

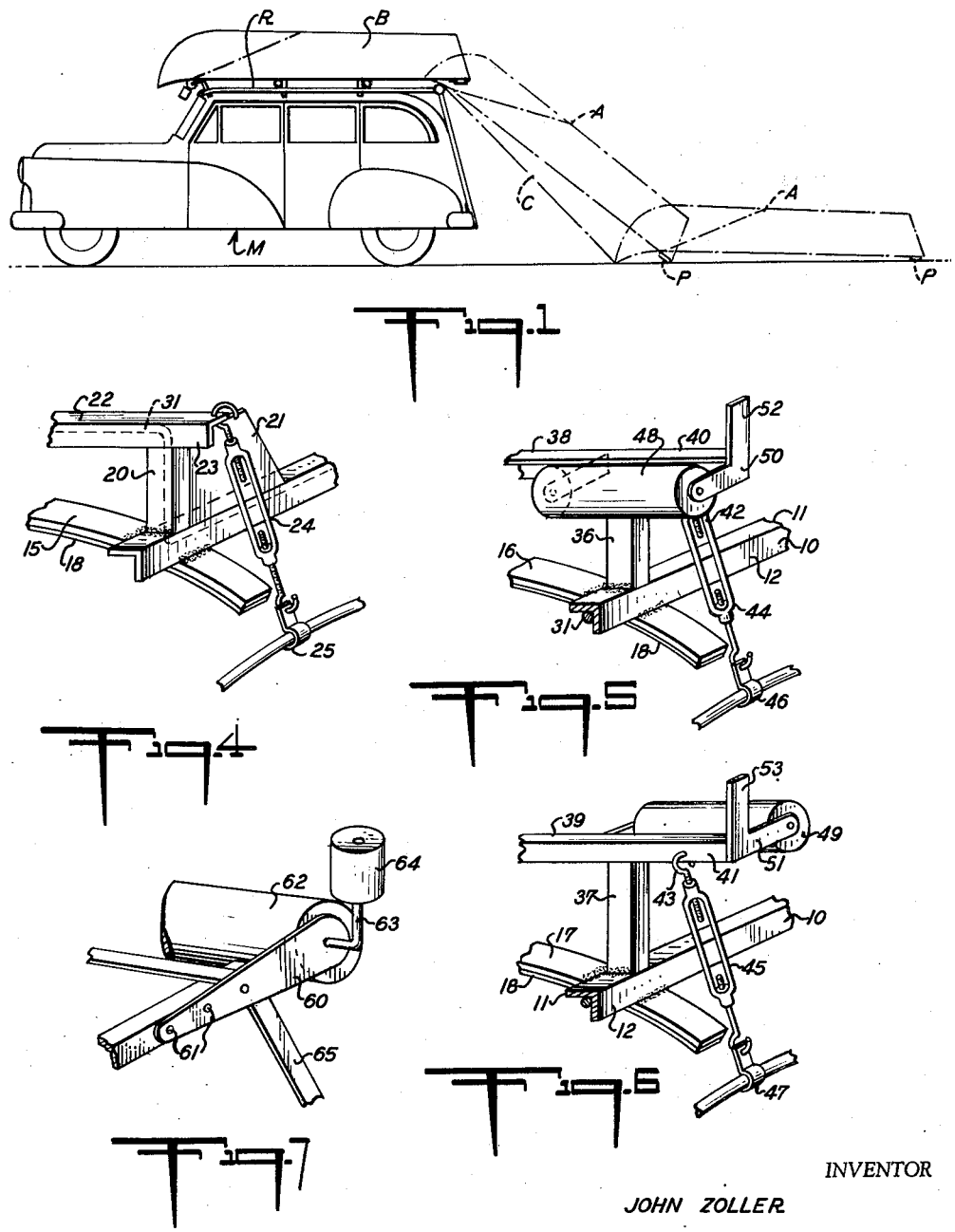

United States Patent Office 2,812,087
Patented Nov. 5, 1957

2,812,087

CAR TOP BOAT CARRIER AND LOADING APPARATUS

John Zoller, Great Falls, Mont.

Application November 18, 1955, Serial No. 547,754

2 Claims. (Cl. 214—450)

This invention relates to boat handling and transportation equipment and is particularly concerned with means for elevating a boat to the top of a motor vehicle and for supporting and securing the same for transportation on the vehicle.

With the present day increase in boating activity, particularly as influenced by the growing popularity of outboard motors, there has been a like increase in the demand for transportation facilities for small boats of the type using such motors. Such demand has been met in part by trailer-type devices for supporting a boat, while the trailer is towed from place to place. While such trailers may be ideal for the land transportation of large boats, they have obvious and distinct limitations. Not only are such trailers expensive, since they constitute of themselves a complete vehicle, but for a like reason, they are difficult to maintain in appropriate running condition and are subject to excessive wear and deterioration. With the use of such trailers there is also the ever present problem of loading and unloading the boat from its location on the trailer.

For small boats devices have been proposed by which the boat may be mounted upon the top of a conventional motor car and secured thereto for transportation. Obviously, a successful device of this type would have many advantages as compared to boat trailers. Not only would they be less expensive, more durable and free from upkeep expense, but they would relieve the driver of the difficulties and hazards of trailer towing. However, boat mountings for automobile tops heretofore suggested, have been complicated, frail and difficult to manage. More important is the fact that no means have been provided to raise or assist in the raising of a boat to its position above the car top. By sheer manual force, the raising of even a small boat to a position above a car requires the full strength, power and skill of more than one person. Adequate securement of a boat after such elevation has also presented problems not fully solved by prior devices.

It is, therefore, among the primary general objects of the present invention to provide a novel and improved car top boat mounting, including adequate boat securing means, as well as incorporating structure to elevate or assist in the elevation of a boat to the car top mounting.

More specifically, it is among the objects of the present invention to provide a car top boat mounting which is simple, effective and efficient, while rugged and durable, as well as being admirably adapted to meet the demands of economic manufacture.

Another object of the present invention is to provide a novel and improved securing means for a car top boat support by which the device may be readily applied and removed without modification of the car body or top and in such a manner as to insure the device against relative vibration or inadvertent displacement.

A further object of the invention is to provide a car top boat mounting having anti-friction means for supporting and guiding a boat as it is moved to proper location for support and securement on the mounting.

It is also one of the primary objects of the invention to provide power means for the elevation of a boat to the top of a car and particularly to provide such means by which a single operator may, without assistance, complete the required elevation and loading operation.

Numerous other objects, features and advantages of the present invention will become apparent from a consideration of the following specification taken in conjunction with the accompanying drawings, in which:

Fig. 1 is a side elevation of a conventional motor car with the present invention applied thereto and with a boat secured in position for transportation, and showing in dotted lines, the movement of the boat from the ground to loaded position.

Fig. 2 is a detailed side elevation of the rack itself;

Fig. 3 is a top plan view of the rack;

Fig. 4 is a fragmentary detail perspective view of the front rack securing means;

Fig. 5 is a similar view of the first intermediate securing means;

Fig. 6 is a similar view of the second intermediate securing means; and

Fig. 7 is a detailed fragmentary perspective view showing the rear roller mountings.

While certain of the novel features of the present invention may be variously designed, constructed, arranged and combined, that preferred embodiment of the invention here presented by way of example, may be generally characterized as comprising a car top rack having longitudinal rails preferably conforming in general to at least a portion of the longitudinal contour of the vehicle top upon which it is to be mounted. Above and between the rails to be disposed transversely of the vehicle, there are mounted intermediate cross bars, the ends of which rotatably mounted transversely arranged boat supporting rollers. In addition to the intemediate cross bars, the rack includes a front cross bar which receives and supports the bow of the boat and which further mounts a power driven winch, its motor and suitable control devices, as for instance, a limit switch for terminating winch operation when the boat is in position for travel. The rack further includes a rear transverse loading roller in combination with vertical end guide rollers. The rear outwardly projecting end of the rack is preferably supported by a substantially vertical pair of bumper mounted struts or braces, while the forward and intermediate bars are engaged by releasable turn-buckles connecting with suitable structure of the car top as the customary rain gutter or the like. A feature of the invention is the provision of motor control switch means at the rear to facilitate winch control as the boat is guided to position.

In the drawings and with respect to Fig. 1, the motor car to which the present device is applied is indicated by the letter M, the rack in general is indicated by the letter R, while the boat bears the letter B. Both the car and the boat, here depicted, are, of course, merely representative of such conventional types of each as may be at hand. The car may be any make or style of hard top coupe, sedan or station wagon and certain types of truck bodies or cabs lend themselves to reception of the rack of the present invention. Similarly, the boat may be of any of the familiar types, particularly the small wood, metal or plastic fishing boats of a length generally not much greater than that of the car top. Preferably the boat is modified to provide skid pads or bearing plates P on its upper face at the stern to facilitate movement toward the car and to protect the upper stern edges. The boat may also be provided with some readily engageable and releasable cable attaching devices, not shown, preferably disposed about midship, as indicated at A for receiving the free outer end of a winch cable C. As will be noted, from Fig. 1, in mounting the boat upon the rack, the boat is first inverted after securement of the cable end therein. Thereafter, as the winch is operated to draw in the cable, the boat is lifted bow upwardly to first engage the rear transverse roller and then to move forwardly to its final horizontal position.

Referring now to the remaining figures of the drawings, depicting the rack itself, it will be seen that the rack includes a pair of parallel elongate side rails 10 which may be conveniently formed of angle iron and disposed in inverted position so as to present a horizontal top surface 11 and outer vertical legs 12. The side rails 10 are of a length approximately that of the longitudinal dimension of the vehicle top or of its projection and while the front sections 13 are curved to conform with the longitudinal curvature of the top, the rear sections 14 are straight to extend horizontally parallel with the ground and thus to jut out in vertically spaced relation to the rear slope of the top. The rails 10 are transversely spaced and retained in parallel relation for disposition at the two side edges of the relatively flat portion of the top by securement, such as welding to front and first and second cross bands 15, 16 and 17 respectively. The cross bands are preferably of flat stock, curved to conform to the transverse curvatures of the top and may have their lower surfaces lined or padded with suitable material 18, such as cloth, leather or fiber to protect the top finish.

While it will be noted that the rack structure thus far described will fit the curvature of the front portion of the top of the motor car M of Fig. 1, it is understood, that various styles of cars may have widely varying top curvatures, both longitudinally and transversely. For any given top, the rack may, of course, be standard. While it is doubtful that a single standard rack may be formed to fit all tops, it is to be noted, that the present construction is admirably adapted to be conformed to a wide variety of curvatures. After fabrication, the flat stock of the cross bands may be readily bent to conform to the desired transverse curvature. Preferably such bands are of slight spring formation to facilitate such conformity. Further, the angle iron rails while rigid, may be deformed after assembly to conform with quite widely differing longitudinal curvatures. However, since only the forward sections 13 of the rails directly engage the top and since, in general, the front longitudinal curvatures of most cars are quite similar, no such bending will usually be required. Hence, the rack here presented, may be substantially standard for most makes and styles of cars.

At the extreme ends of the front downwardly turned sections 13 of the side rails and directly over the forward band 15 are mounted parallel vertical front standards 20 which may also be of angle iron and which are braced by a longitudinally extending gusset plate 21 welded thereto and to the upper faces 11 of the side rails. Extending between and projecting beyond the standards 20 is the front cross bar 22, the projecting ends 23 of which are apertured to receive the upper ends of front securing turnbuckles 24, the lower ends of which engage the car top rain gutter as at 25. As more clearly shown in Figs. 2 and 3, the front cross bar 22 also mounts a central forwardly extending winch and motor bracket 26. The bracket 26 supports a conventional small winch 27 powered by an electric motor 28. On the driver's side of the front cross bar 22 there is also mounted solenoids 29 which act as limit switches for terminating the motor activity after the boat is in position. The solenoids are further under the control of a switch 30 located at the rear of the car, so that the operator may guide the boat as it is lifted, while at the same time having full control of the motor 28. It will be noted that the inverted angle iron side rails provide a favorable location for the motor control cables 31.

Directly over the first and second cross bands 16 and 17, the side rails are provided with parallel pairs of first and second standards 36 and 37 respectively, which standards are similar to and in line with the standard 20. Furthermore, in similarity with the cross bar 22, the standards 36 and 37 carry cross bars 38 and 39 respectively, the protruding ends 40 and 41 of which are engaged by the upper ends 42 and 43 of turnbuckles 44 and 45. As with the lower end of the turnbuckles 24, the lower ends of the turnbuckles 44 and 45 engage the rain gutter 25 or a like portion of the top, as indicated at 46 and 47. Mounted at each end of the cross bars 38 and 39, there is provided a transversely disposed roller. The rollers 48 of the first cross bar 38 are located forwardly of the cross bar as seen in Fig. 5 and are supported upon an end bracket 50 having upstanding guide flanges 52. The rollers 49 of the second cross bar 39 are located rearwardly of the cross bar and are similarly mounted on end brackets 51 having an upstanding guide flange 53. In both instances, it will be noted, that the rollers provide a top surface above the plane of the top of the cross bars and thus, the rollers will engage the inverted top edges of the gunwales of the boat, thus acting as antifriction means as the boat is drawn forward on the rack and acting as supports when the boat is in position for transportation.

At the extreme rear ends of the side rails 10, see Fig. 7, horizontally extending extension brackets 60 are secured as by the bolts 61. Between the brackets 60 a transverse roller 62 is rotatably mounted. The length of the roller 62 is equal to the spacing between the brackets, thus to provide an antifriction support for the boat as it is drawn upward to the top of the car. The full width of the roller 62 insures support for the boat throughout its travel upwardly, regardless of the diminished width of the bow and the increasing cross section towards the center. The roller 62 is preferably mounted upon outwardly extending and upwardly turned pintles 63 upon the vertical ends of which are mounted vertical guide rollers 64. This arrangement is such that, as the boat is drawn up over the roller 62 by the winch cable C, any side slippage will be prevented by contact with the rollers 64 and the central alignment of the boat on the rack will be assured.

For supporting the outwardly extending horizontal rear sections 13 of the side rails, a pair of parallel and substantially vertical struts or braces 65 are provided. The upper ends of the struts 65 may be welded to the side rails just inwardly of the brackets 60, while the lower ends are formed with furcated clevis structures 66 to engage over and be secured to the rear bumper of the car. Thus, it will be seen that the rack is supported at its front, by direct contact with the car top, but that the outwardly overhanging rear portion is supported from the car bumper.

From the foregoing, it is believed that the operation and use of the present invention will be apparent. Suffice it, therefore, to state that with the rack arranged as indicated on the car top and secured by the turnbuckles and by the struts and with a boat arranged in inverted position behind the car, as indicated by the dotted lines of Fig. 1, the winch cable may be payed out to be engaged within the boat preferably at a midpoint thereof. With the cable secured to the boat, the operator may energize the motor 28 from the rear of the car through switch 30. As the winch 27 draws in the cable, the bow of the boat will be raised to the rear roller 62, the operator being at hand to guide the boat in such elevation of the bow. Continued operation of the winch will draw the boat forward over the top, its movement being guided by the vertical rollers 64. As the boat moves forward, it will be received successively by the second and first rollers 49 and 48 and finally the bow will be received on the front cross bar 22. When the boat is in final transportation position, the motor will be de-energized either by the operator's manipulation of the switch 30 or by automatic operation of the limit solenoid 29. Since, the winch may be arranged to maintain the tension on the cable and since, the cable is secured at a mid-point of the boat, such tension may suffice to retain the boat in position during transportation. However, if desired, other securing means may be employed, such as a pivoted strap 67 bolted to the side rail at an intermediate point and movable to a vertical position where its apertured end 68 may be secured to the side of the boat for additional retention. When the boat is to be removed from the top for use, a simple slackening of the cable will permit the boat to be rolled rearwardly on the rollers and tilted downwardly. By advancing the car as the cable is slackened the boat may be lowered to horizontal position with a minimum of effort.

While angle iron and flat straps have been suggested in the present description and while welding has been proposed, it will, of course, be understood, that the invention is in no way restricted to any such features. Nor is the invention limited to any of the specific structural details here presented. Thus, in the practice of the invention, numerous changes, modifications and the full use of equivalents may be resorted to without departure from the spirit or scope of the invention, as outlined in the appended claims.

What is claimed is:

1. In a device of the character described a rack comprising spaced, substantially parallel side rails, a plurality of cross bands connecting said side rails at longitudinally spaced points, said bands being curved to conform to the configuration of a vehicle top, a front cross bar connecting said rails at the forward end, a power driven winch mounted on said cross bar, a first intermediate cross bar spaced rearwardly of said front cross bar and connecting said rails, a pair of rollers mounted on said first intermediate cross bar forwardly thereof adjacent each end, a second intermediate cross bar spaced rearwardly of said first intermediate cross bar and connecting said rails, a pair of rollers mounted on said second intermediate cross bar rearwardly thereof adjacent each end, upstanding flanges at the opposite ends of said first and second intermediate cross bars providing guides for the gunwales of a boat supported on said rollers, a rear roller extending substantially the full distance between said rails and rotatably mounted thereon at the rear ends, upstanding side guide rollers at each end of said rear roller, a downwardly and rearwardly extending strut fixed to the rear end of each rail and having means engaging the rear bumper of the vehicle to support the rear ends of said rails, a cable attached to said winch for loading a boat on said rack, means on one of said struts for controlling said winch, boat securing means comprising a rigid strap pivotally mounted on one of said rails between said second intermediate cross bar and said rear roller and means on said strap for attaching the same to a boat to secure said boat in place on said rack and means for removably securing said rack on a vehicle.

2. In a device of the character described a rack comprising spaced substantially parallel side rails, a plurality of cross bands connecting said side rails at longitudinally spaced points, said bands being curved to conform to the configuration of a vehicle top, a front cross bar connecting said rails at the forward end, a power driven winch mounted on said cross bar, a first intermediate cross bar spaced rearwardly of said front cross bar and connecting said rails, a pair of rollers mounted on said first intermediate cross bar forwardly thereof adjacent each end, a second intermediate cross bar spaced rearwardly of said first intermediate cross bar and connecting said rails, a pair of rollers mounted on said second intermediate cross bar rearwardly thereof adjacent each end, upstanding flanges at the opposite ends of said second first and second intermediate cross bars providing guides for the gunwales of a boat supported on said rollers, a rear roller extending substantially the full distance between said rails and rotatably mounted thereon at the rear ends, upstanding side guide rollers at each end of said rear roller, a downwardly and rearwardly extending strut fixed to the rear end of each rail and having means engaging the rear bumper of the vehicle to support the rear ends of said rails, a cable attached to said winch for loading a boat on said rack, means on one of said struts for controlling said winch and means for removably securing said rack on a vehicle.

References Cited in the file of this patent

UNITED STATES PATENTS

| | | |
|---|---|---|
| 2,238,655 | McAdams | Apr. 15, 1941 |
| 2,247,128 | Levey | June 24, 1941 |
| 2,318,971 | Roumage et al. | May 11, 1943 |
| 2,400,312 | Miller | May 14, 1946 |
| 2,716,499 | Grant | Aug. 30, 1955 |